United States Patent [19]

Baker et al.

[11] 4,456,793
[45] Jun. 26, 1984

[54] CORDLESS TELEPHONE SYSTEM

[75] Inventors: William E. Baker, Holmdel; Fritz E. Froehlich, Little Silver; Hans G. Mattes, Indianapolis, all of N.J.

[73] Assignee: Bell Telephone Laboratories, Incorporated, Murray Hill, N.J.

[21] Appl. No.: 386,722

[22] Filed: Jun. 9, 1982

[51] Int. Cl.³ .................. H04M 1/72; H04M 3/22
[52] U.S. Cl. ................................. 179/99 R; 179/82
[58] Field of Search ............ 179/99 R, 82, 2 EB, 179/2 EA, 99 M, 81 R; 455/3733, 606, 607; 340/311.1, 825.06, 825.07, 825.08

[56] References Cited

U.S. PATENT DOCUMENTS

| | | | |
|---|---|---|---|
| 4,275,385 | 6/1981 | White | 340/312 |
| 4,292,474 | 9/1981 | Morrell et al. | 179/99 |
| 4,317,232 | 2/1982 | Pickett et al. | 455/606 |
| 4,317,233 | 2/1982 | Kunde et al. | 455/606 |
| 4,317,234 | 2/1982 | Kunde et al. | 455/606 |

OTHER PUBLICATIONS

Proceedings of the IEEE vol. 67, No. 11, Nov. 1979, "Wireless In–House Data Communication via Diffuse Infrared Radiation," pp. 1474–1486.
Optical Spectra, Dec., 1979, "IBM Uses Infrared to Transmit Data," pp. 16, 18, 19 & 20.
IEEE, Aug., 1978, "Infrared Communication for In--House Application," pp. 132–138.

Primary Examiner—Stafford D. Schreyer
Attorney, Agent, or Firm—T. H. Jackson; H. L. Newman

[57] ABSTRACT

The present key telephone system comprises cordless telephone stations (FIGS. 6 and 7) which communicate over a line-of-sight transmission end link (276 or 277). The system further comprises a central controller (101) for switching communications between the cordless stations and to the message network. The central controller does not provide any station to transmission channel concentration. Concentration occurs in the bidding by a cordless station for access to a channel provided by the line-of-sight transmission end link. A particular number of transmission channels are provided by the line-of-sight end link which are bid for by any practical number of cordless stations. Subsystem controllers (104) are provided in a large cordless key telephone system. The subsystem controller reformats data for transmission between the central controller (101) and a cordless station. A unique code identifies a cordless station so that the allocation of a new channel to a cordless station may occur automatically when a cordless station is detected within the boundaries of a new subsystem.

16 Claims, 9 Drawing Figures

TYPICAL OPTICALLY-ISOLATED AREA
◯ TRANSDUCER
△ CORDLESS TELEPHONE

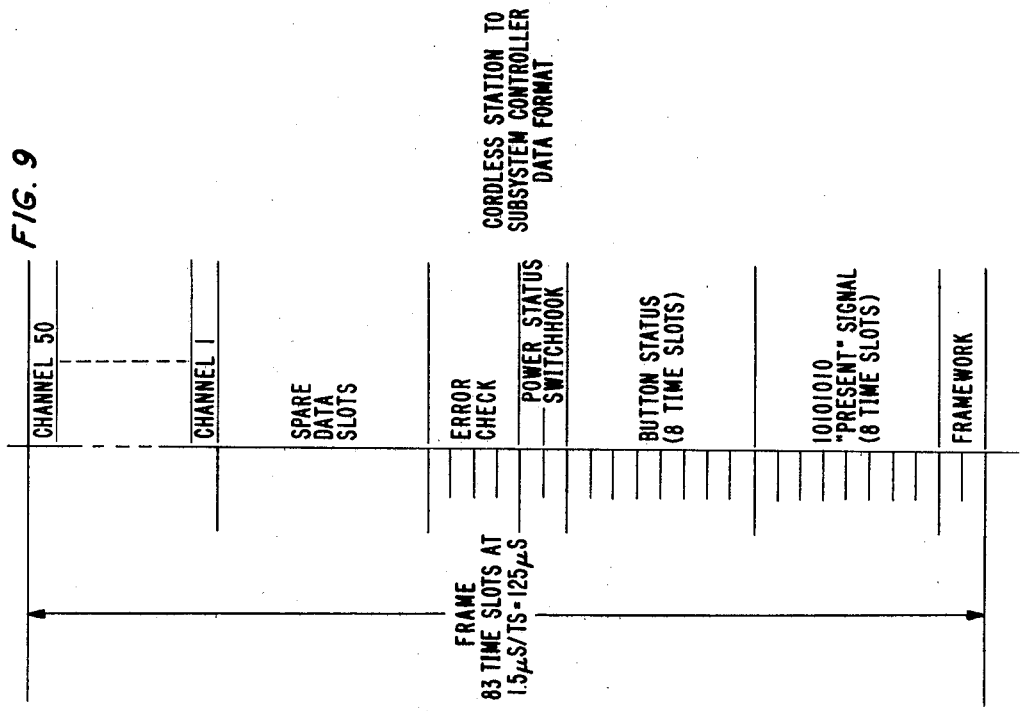
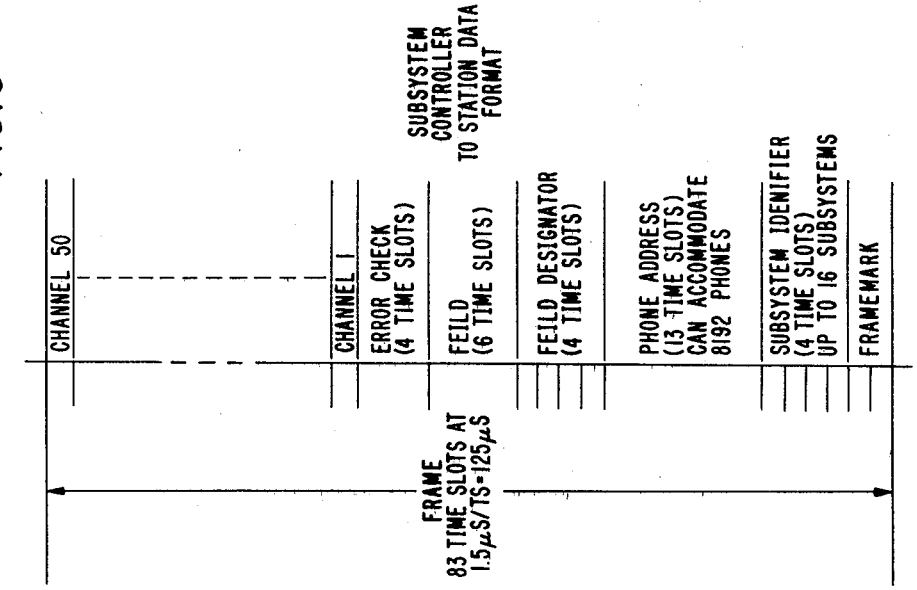

CORDLESS TELEPHONE SYSTEM

TECHNICAL FIELD

This invention relates to key telephone systems and, more particularly, to a key telephone system employing infrared transmission and comprising cordless telephone station sets.

BACKGROUND OF THE INVENTION

Cordless telephone station sets are commercially available which employ a radio transmission link between a portable hand-held unit and a fixed base station unit. Some of these telephone sets operate over a particular radio frequency channel. In cellular mobile radio, the mobile set bids for access to a plurality of radio frequency channels. Access to channels is provided by a centralized controller through a transceiver at a cell site. The problem with radio telephone systems generally is the limited availability of radio frequency spectrum, the undesirability of interference between transceivers operating at similar frequencies, and, hence, the insecurity of any communications.

To overcome these problems, cordless telephone sets have been proposed which employ line-of-sight transmission which may be defined as transmission at frequencies above approximately one gigahertz. In particular, the safety to the user and other considerations have pointed development in the area of cordless telephony towards infrared transmission.

It has been reported that a cordless infrared telephone set has been designed at Siemens Aktiengesellschaft, Munich, West Germany. The set comprises a wall-mounted stationary unit and a hand-held telephone set equipped with a dialing keyboard and a control keyboard of three keys. A user may use the hand-held set anywhere in a room, unconfined by cords. Interference with transmission to wall-mounted stationary units by sunlight and other infrared sources is overcome to a degree by mounting the stationary unit near or on the ceiling of a room and by employing infrared-reflecting window panes which are often installed to save energy in modern buildings.

It has also been reported that a data communications system has been developed at IBM Zurich Research Laboratory which incorporates a plurality of cordless data terminals capable of operation at 125 Kbits/s. It is further reported that a 125 Kbits/s optical data transmission link has been built and a switched in-house data network designed which comprises a host and cluster controllers connected by conventional house cable. The cluster controller is connected by house cable to a number of rooms where a ceiling mounted satellite controls access to a number of data terminals over the optical link. Communications are reasonably secure in accordance with the above discoveries. Telephone rewiring of a premises is required when telephone stations are moved from one room to another.

In U.S. Pat. No. 4,275,385, a personnel locater system is disclosed comprising portable transmitters. Each transmitter is personal to an individual who carries it and transmits a unique code. A master processor is capable of identifying the vicinage of a transmitter as it identifies which ceiling mounted receiver has reported the code. In this manner, local alerters in the vicinity of the received transmission can alert a needed individual. Only one way transmission is disclosed. A portable transmitter, in accordance with the disclosed system, is capable of movement outside the boundaries of a room, unlike the communications devices of the IBM and Siemens disclosures.

It is generally believed advantageous to maintain maximum flexibility in telephone systems. It is desirable that office and telephone station rearrangements occur without expensive rearrangements of conventional telephone house cable. Records as to features, services and locations of particular telephones within a particular system should be centrally maintainable without human intervention. Once a premises is equipped with a plurality of ceiling mounted transceivers, no further intervention should be required when a telephone is moved within the network. A portable telephone station set should be capable of being carried about a premises. In the process of being moved from room to room, the portable set should permit an on-going telephone conversation to continue without interference or concern about the confidentiality of the communication.

Furthermore, it is well known that a one channel to one station ratio is uneconomical and impractical in operation. A means for allocating line-of-sight transmission channels among a number of cordless stations is required for the practical implementation of a cordless key telephone system.

SUMMARY OF THE INVENTION

The problems and limitations of the prior art are overcome by the principles of the present cordless key telephone system employing infrared transmission. The cordless telephone station apparatus of the present system may comprise single line telephone sets or multiline key telephone sets, data terminals, facsimile devices or other types of communication devices. At least the single line and small key telephone sets are portable and battery-powered and may be carried about a premises during an on-going telephone conversation without fear of interference or security of communications.

For a sufficiently large number of stations, a central controller is provided for switching communications among cordless stations associated with a plurality of subsystem controllers and to or from the direct distance dialing network. A subsystem controller provides a particular number of channels for communicating with any practical number of cordless telephone stations, a feature of the present system being its means for allocating channels of a line-of-sight transmission end link. Traffic studies suggest that, with a normal mix of data and analog telephone stations, a fifty channel subsystem is capable of supporting five hundred stations.

The line-of-sight transmission end link connects a cordless telephone station and a transceiver which may be mounted in the ceiling. The transceiver is connected to the subsystem controller by an optical fiber link. The optical signal is demodulated and decoded at the location of the subsystem controller. In an alternative embodiment, demodulation may occur at the location of the ceiling mounted transceiver and a coaxial cable link may connect the transceiver to the subsystem controller.

A premises is divided into a plurality of rooms, hereinafter referred to as cells, which may be optically isolated from one another. A long, angular hallway may be a cell. Ceiling mounted transceivers are dispersed about a cell such as a hallway so that nominal transmission distances are not exceeded. A single room cell normally requires only one transceiver.

A subsystem of the present cordless system comprises a number of proximately located cells. For example, one floor of an office building constitutes a reasonable subsystem.

Within the memory of the central controller are stored unique codes for each subsystem and station within the subsystem. Particular information regarding each station including its current or last reported location, its features, current subsystem assignment, main line number, pick-up station numbers, traffic data and other information is stored in temporary memory of the central controller. The central controller may be either a space or time division controller known in the art.

In connection with a rearrangement of cordless stations, the central controller periodically and automatically causes a subsystem controller to poll for its assigned stations by their unique station codes. A station normally responds with a present signal if it is within its assigned subsystem. If a station is missing and not within an assigned subsystem, the central controller causes adjacent subsystems to poll for missing stations. Once detected, a missing station's new subsystem data is automatically stored in central controller memory. In this manner, a rearrangement of stations is accomplished without human intervention.

Once a channel is allocated for transmission between a station and its assigned subsystem controller for a telephone communication, a cordless portable station may be hand-carried from cell to cell without interrupting an on-going telephone conversation. At the perimeters of a subsystem, a channel in an adjacent subsystem may be obtained pursuant to the previously described process of locating a "missing" phone. Passing from one cell in one subsystem to a cell in an adjacent subsystem causes only a brief, hardly perceptible interruption or click.

In the subsequently described embodiment of the present invention, modulated infrared transmission is suggested for the line-of-sight transmission end link for safety and other reasons. The modulated infrared transmission is accomplished in the station to ceiling-mounted transceiver direction at baseband modulation frequencies between ten and fourteen megahertz and, in the transceiver to station direction at sixteen to twenty megahertz, thus permitting a four megahertz bandwidth in each direction. A fifteen megahertz modulation signal is employed for frame synchronization.

A frame of data for transmission over the optical end link comprises eighty-three time slots, fifty of which time slots comprise fifty one way communication channels. The communications signal for transmission over a time slot channel is sampled at eight kilohertz and the resulting sample is transmitted as a frequency burst where the frequency is a linear function of the sampled voltage.

Depending on the direction of transmission and the particular station type and features, the thirty-three remaining time slots comprise various categories of data. In the subsystem controller to station direction, the data comprises a unique station code, its corresponding subsystem identifier, a field code and designator for, for example, channel assignment data, error check bits at the end of data, and a framemark to signify the beginning of data. Responsive to a polling request, a cordless station transmits toward the subsystem controller the following data: button and lamp status change data, switchhook status, power status as, for example, after a low battery detection check, a present signal, and framemark and error check bits.

BRIEF DESCRIPTION OF THE DRAWINGS

FIG. 8 is a depiction of a frame of data for transmission from a subsystem controller transceiver to a cordless station; and FIG. 9 is a depiction of a frame of data for transmission from a cordless station to a subsystem controller.

DETAILED DESCRIPTION

Figure 1:
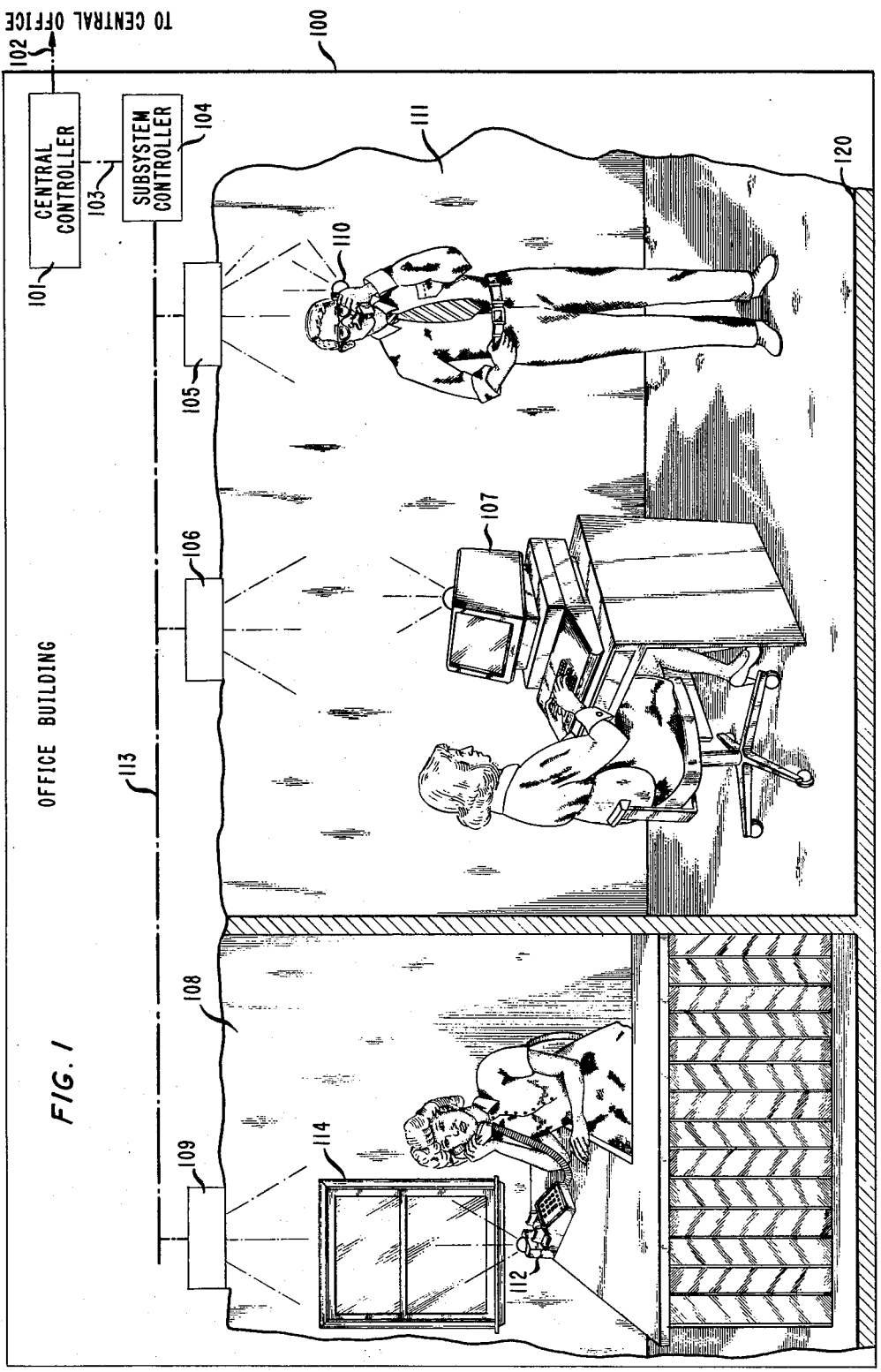
FIG. 1 is a pictorial representation of how a large system in accordance with the present invention is physically constructed within the confines of a telephone customer's premises.

Referring to FIG. 1, a pictorial representation is shown of how a large cordless key telephone system in accordance with the present invention is physically constructed within the confines of a telephone customer's premises. A customer's premises may be a large, multistoried office building 100, a particular floor 120 of which is shown in cut-away view. A floor 120 comprises a number of rooms 108 or 111.

Line-of-sight transmission frequencies above approximately one gigahertz are suggested for transmission within rooms 108 and 111. Safety and other factors currently tend to limit the choice of line-of-sight frequencies for cordless transmission to those in the infrared region. This is not to suggest that other frequency bands above one gigahertz may not be applied in the present invention. Advances in technology at other line-of-sight frequencies which are safe to users may disclose new bands of line-of-sight frequencies which may be employed.

Windows 114 of building 100 may be constructed of reflective materials at the line-of-sight frequency band of interest. With infrared frequencies, reflective glass is energy efficient and, when used with the present invention, preserves confidentiality of communications. The present system has a high modulation coefficient and a correspondingly high signal-to-noise ratio.

Each room 108 or 111 is constructed so as to incorporate ceiling mounted optical transceivers 105, 106, or 109. Telephone communications terminals employed in the present system may comprise computer data terminals 107, hand-held portable telephones 110, key telephone sets 112 or other types of telephone terminals known in the art. The telephone terminals of the present invention are distinguished in their lack of telephone cabling. Since large computer data terminal 107 consumes considerable power, it must be located proximate to an alternating current power outlet. Despite this limitation, computer data terminal 107 may be moved anywhere within the present cordless key telephone system without the assistance of telephone installation personnel.

Key telephone set 112 comprises a hold button, multi-line pick-up capability and most other features currently known in the art. Visual indicators, such as lamps or light emitting diodes, and keys mounted on the set 112 identify to the user thereof the status of the lines and features. By efficient power design, key telephone sets of the present system may be battery-operated.

Hand-held portable telephone set 110 has line pick-up capacity and is capable of being moved freely from room 111 to room 108 even during an ongoing telephone communication. In its idle state, hand-held set 110 should be rested upon a charging stand for restoration of its associated batteries after each use.

Telephone terminals 107, 110 and 112 are equipped with optical transceivers for optical communication at line-of-sight transmission frequencies with ceiling mounted transceivers 105, 106, and 109. Even when idle, key telephone station 112 is frequently polled so that visual indicator status information can be updated, the indicator status relating to the busy status of the multiline pick-up capability of set 112.

The ceiling mounted transceivers 105, 106, and 109 should be located so as to optimize optical transmission. In room 108 or room 111, the ceiling mounted transceiver may be mounted in a dark corner either on the ceiling or high on a wall. Fluorescent light fixtures are less likely to interfere with transmission. Yet, while one might presume that the three surfaces of walls at a corner tend to focus the light beams, it has been discovered that they do not guide optical transmission and reception. A further problem with corner-mounted transceivers is that a door or other optical barrier is likely to be present which blocks or otherwise limits transmission and reception. Therefore, centrally located ceiling-mounted transceivers have proven viable and promote optimum transmission.

In a sufficiently small room 108, only one transceiver 109 is required. In a large room 111 or a long angular corridor, a plurality of optical transceivers may be required. In the depicted example, transceivers 105 and 106 are most conveniently spaced at some distance less than the maximum transmission distance of the transceiver. In angular corridors, a transceiver must be so located as to encompass transmissions from the vertex of the angle.

A floor having a plurality of transceivers most conveniently forms a subsystem of a large cordless key telephone system. All transceivers within a subsystem are connected to a subsystem controller 104 by optical fiber cable or coaxial cable 113 depending on the capabilities incorporated into transceivers 105, 106, or 109.

In particular if the transceiver serves an optical repeater function, the connecting media is most conveniently optical fiber. If the transceiver serves a greater function, that is, one of transduction from large bandwidth energy to large bandwidth electrical energy, then the connecting media is most conveniently coaxial cable.

Of the above alternatives, the connecting media most conveniently employed is optical fiber. Thus, the functions of transduction, modulation, and coding occur at the location of the subsystem controller 104. Subsystem controller 104, in addition to transmission circuitry, comprises a processor having permanent and semipermanent memory. For each telephone station it serves, it stores in semipermanent memory a particular unique address code, the latest transmitted and received button and light status data, and transmission channel assignment data. Fifty optical transmission channels for communications data are provided to each transceiver within a subsystem. No switching is performed by subsystem controller 104. All fifty transmission channels are connected to a central controller 101 over a telephone house cable and bus 103. In other words, no concentration between lines and channels occurs at subsystem controller 104. Concentration or channel allocation in the present system occurs when a telephone station bids for an optical channel of its associated subsystem controller. Channel allocation will be more particularly discussed in the subsequent discussion of FIGS. 5, 6, 7, 8, and 9.

Between subsystem controller 104 and each transceiver, the modulated optical signal comprises both telephone and data channels. Between subsystem controller 104 and central controller 101, fifty cable pairs are used for the telephone information and other leads of cable 103 are employed for a central controller/subsystem controller bus. Control and data information flow back and forth over the bus between the central controller and subsystem controller.

The central controller 101 is an electronic space division switching system comprising permanent and semipermanent memory. It may be a microprocessor, in particular, a 16 bit microprocessor known commercially as an Intel Corp. 8086. In performing its switching function, it is capable of connecting any one of the fifty channels of one subsystem 104 to any other channel of that subsystem or to any channel of any other subsystem. In addition, central controller 101 controls incoming and outgoing calls to a telephone central office over trunk cable pairs 102.

Traffic studies for the present system indicate that each subsystem for controlling fifty transmission channels may conveniently comprise five hundred stations given a normal mix of data terminals 107, hand-held portable telephone sets 110, key telephone sets 112, and other types of telephone station apparatus. For a large office building, central controller 101 may be engineered to handle a large number of subsystems 104.

Figure 2:
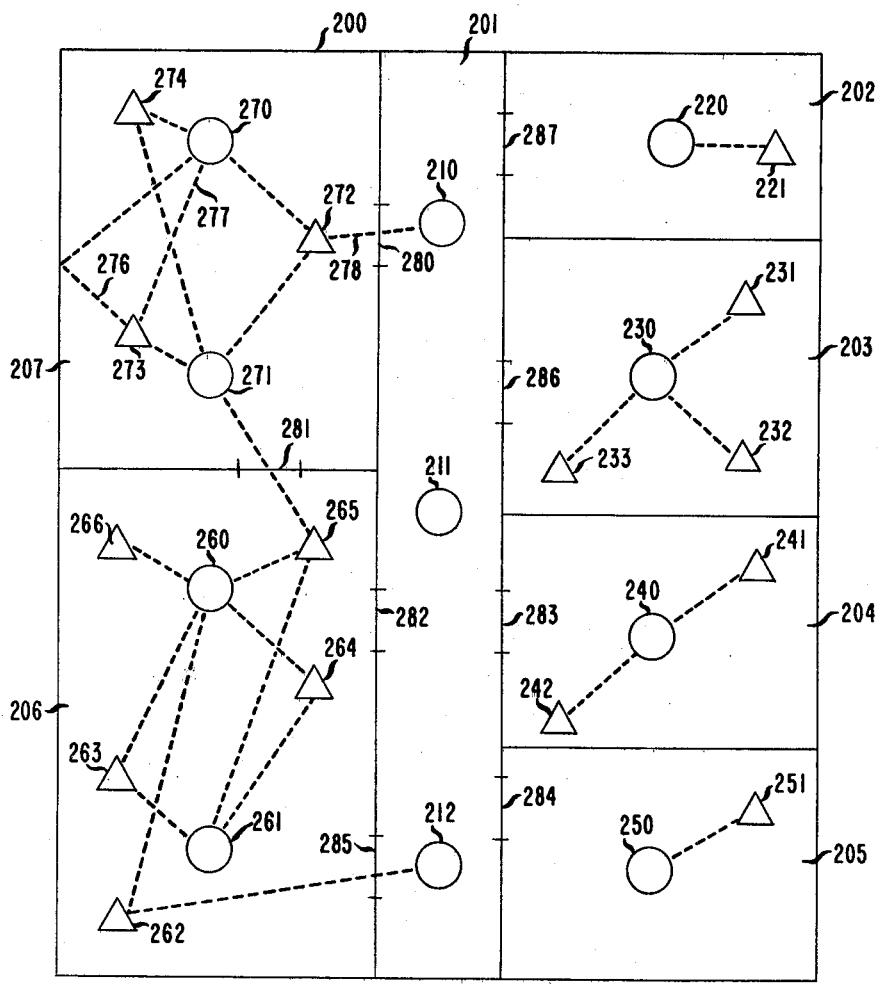
FIG. 2 is a pictorial representation of one floor arrangement for the premises depicted in FIG. 1, the depicted floor arrangement being an exemplary subsystem of a large cordless key telephone system in accordance with the present invention.

Referring now to FIG. 2, a pictorial representation is shown of one floor arrangement for the premises depicted in FIG. 1. The depicted floor arrangement represents one exemplary subsystem of a large cordless key telephone system in accordance with the present invention.

Subsystem 200 comprises cells 201 through 207. Cells 202 through 207 are individual rooms while cell 201 is a corridor connecting the rooms. The rooms have open or closed portals 280 through 287.

All optical transceivers 210, 211, 212, 220, 230, 240, 250, 260, 261, 270, and 271 are arranged geometrically without particular concern to the construction of the rooms or corridors. If a wall is knocked down and relocated and the intertransceiver distance kept small enough, there likely will be no requirement to ever relocate optical transceivers. In other words, while the maximum length of an optical transmission link may be a hundred feet or more, the design of subsystem 200 is neither dependent on that distance nor on the present and future location of optical boundaries such as walls. Proper choice of a geometric arrangement of transceivers depends on permanent features of the floor arrangement such as column locations, plumbing facilities, stairwells, and elevator shafts.

Considering cells 202 and 205, they are, for example, typical one person offices. Their distinctions reside in the location of their cordless telephones 221 and 251. Cells 203 and 204 are offices where there are more than one cordless telephone. The cordless telephones 231–233 and 241–242 may likely be battery powered key telephone sets.

Large office areas such as cells 206 and 207 may comprise a combination of various types of cordless telephone apparatus. Such apparatus as data terminals may have to be located next to alternating current outlets.

Referring particularly to cell 207, various kinds of transmissions may occur between a station and a ceiling mounted transceiver. For example, telephone station 273 may communicate in a line-of-sight path 277 to transceiver 270 or via a reflected path 276. An infinite number of reflected paths are conceivable. In addition, telephone station 273 communicates with any other transceiver not blocked by an optical barrier of some sort. Problems caused by delayed and attenuated reflections or transmissions to other transceivers are solved by zero crossing techniques known in the art and will be particularly addressed in the discussion of FIGS. 6 and 7. Since portals such as portal 280 may be left open, temporary communication may be established over link 278 for the brief period the portal is left open. The problem presented thereby, however, is no different than the multiple transceiver reception problem mentioned above.

Figure 3:
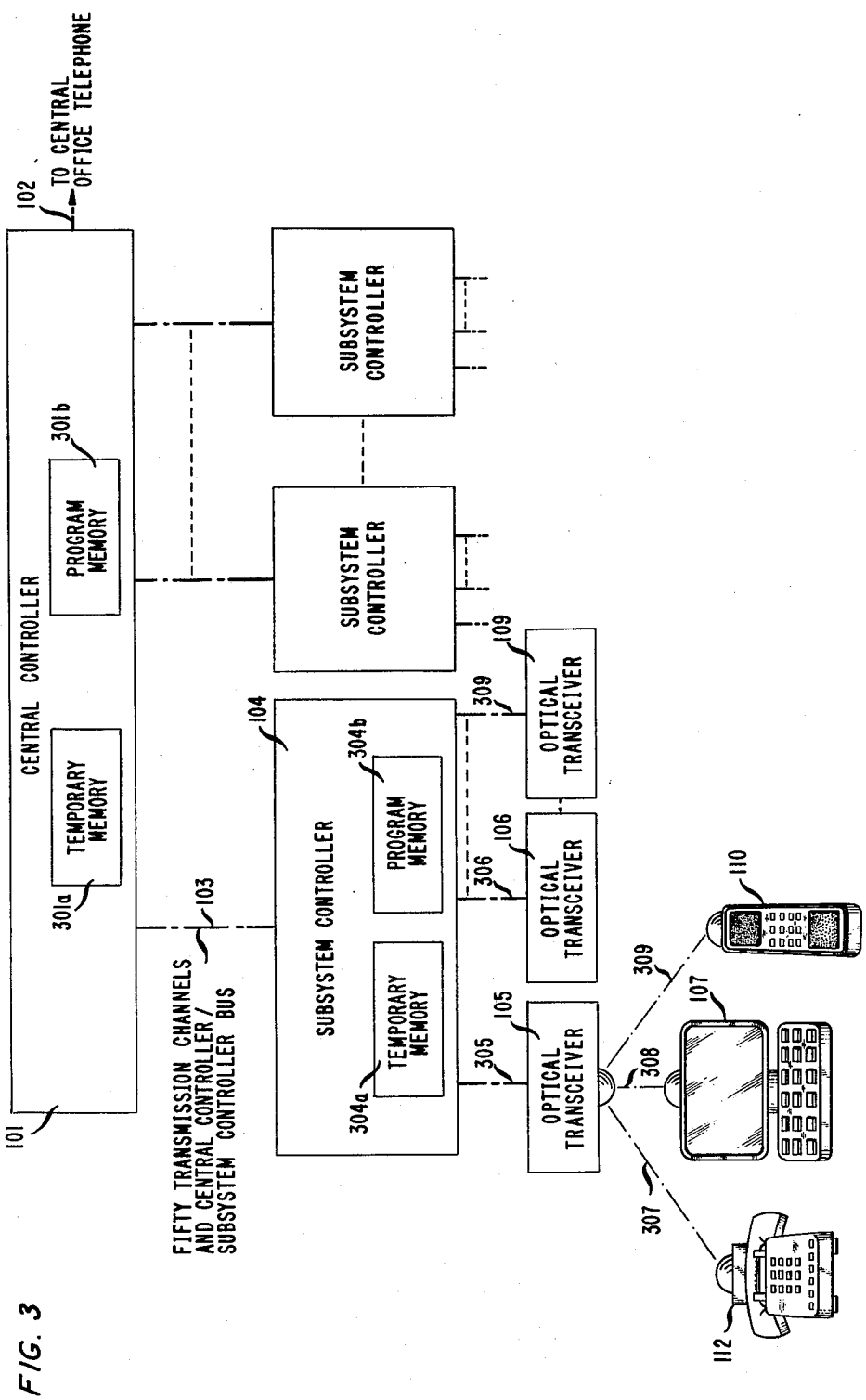
FIG. 3 is a general block diagram of a large cordless key telephone system employing infrared transmission in accordance with the present invention.

Referring to FIG. 3, a general block diagram of a large key telephone system is shown in accordance with the present invention. The first digit of reference characters for elements depicted in this and subsequent figures indicate where the depicted element first appears.

A central controller 101 comprises program memory 301b for storage of call processing, maintenance, traffic, feature, and other algorithms required for operation of the present system. Temporary memory 301a records the current association between telephone terminal apparatus 107, 110, and 112 and subsystem controller 104 as well as for all other subsystem controllers. In addition, temporary memory records the call processing status of all lines, channels, trunks, dial detection circuits and service circuits, their traffic usage data, and maintenance status. Central controller 101 is connected to a telephone central office by trunk cable 102 and to subsystem controller 104 by telephone house cable 103. All other subsystem controllers are similarly connected to central controller 101.

Telephone house cable 103 comprises fifty two-way communication channels and a central controller/subsystem controller bus. The bus provides a two way data channel between central controller 101 and subsystem controller 104.

Subsystem controller 104 comprises program memory 304b for storage of transmission data channel control algorithms. These algorithms operate responsive to the operation of associated telephone station apparatus 107, 110, or 112 to provide data to central controller 101 over its subsystem controller bus 103. The data comprises line status data, power status data, channel request data, present signal data, and acknowledgement data that ordered tasks have been performed. The algorithms operate responsive to the control of central controller 101 to provide telephone station apparatus 107, 110, or 112 with channel assignment and polling data comprising particular unique telephone set data and subsystem data. In addition, these algorithms comprise maintenance programs which may be operated during idle periods.

Subsystem controller 104 also comprises temporary memory 304a for maintaining current the various data described above. The subsystem controller serves to terminate optical fiber cable pairs 305, 306, and 309 and all other optical fiber cable pairs to associated transceivers. At the terminus of the optical fiber cable pairs is an optical multiplex port capable of transmitting and receiving an optical signal associated with a particular number of optical fiber cable pairs. The number of optical multiplex ports provided by a particular subsystem controller is determined by the number of optical fiber cable pairs and associated optical transceivers. Several stages of ports connected in tandem may be required in large subsystems. The result of such an arrangement is that a transmit port and a receive port are provided to which are connected in tandem optical to electrical signal transducers, modulation and demodulation circuits, and encoding and decoding circuits.

Optical transceiver 105 and all other transceivers 106 through 109 comprise optical repeater, detection and transmission circuitry. A two way optical channel 307 or other channels 308 and 309 are provided between a particular optical transceiver 105 and any stations within optical transmission boundaries such as stations 112, 107, and 110, respectively.

CENTRAL CONTROLLER

Figure 4:
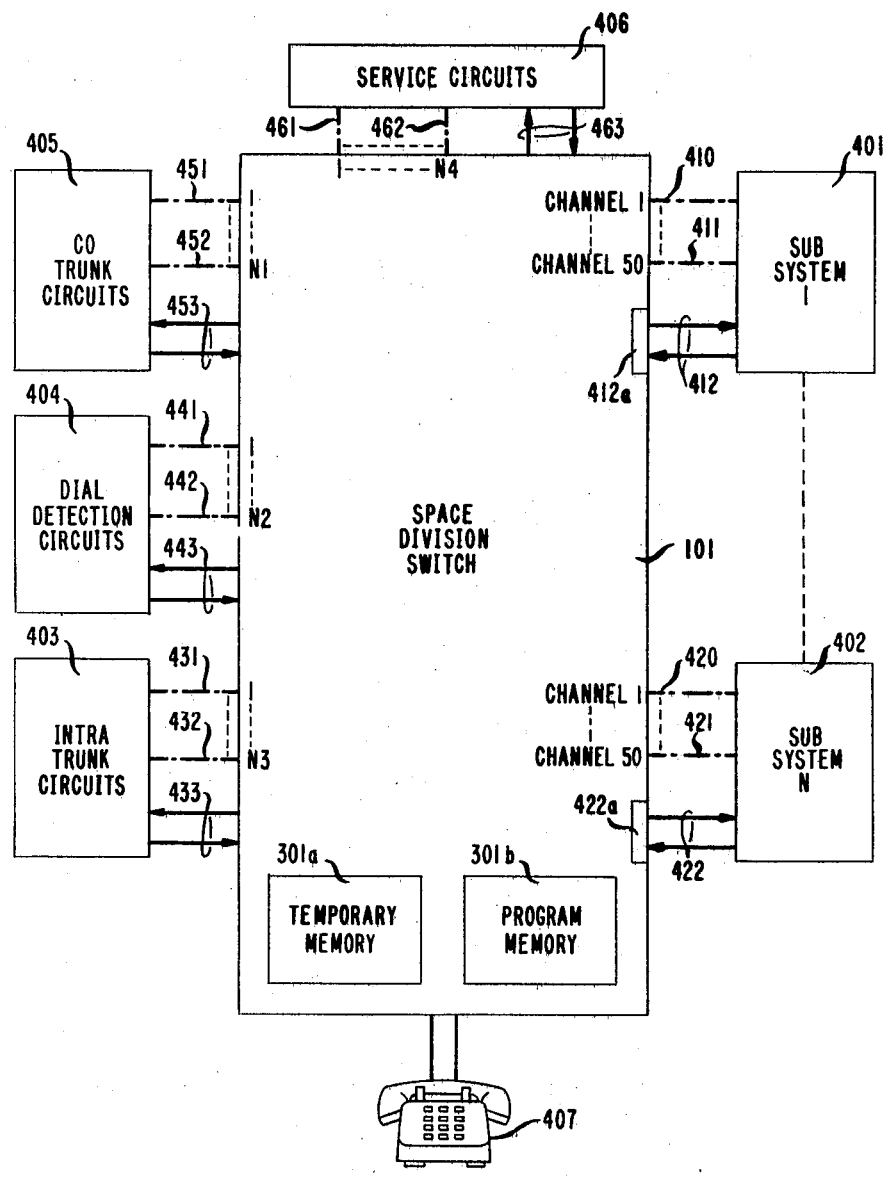
FIG. 4 is a block diagram of a central controller of the space division switching type which may be employed in the present cordless key telephone system.

Referring to FIG. 4, a more particularized block diagram of a central controller is shown than is provided by either FIG. 1 or FIG. 3. In particular, it is appropriate to recognize that central controller 101 is most conveniently an electronic space division switch generally known in the art which operates in much the same way as those not employed in a cordless environment.

When a station in subsystem 401 goes off hook, data is provided to the central controller over controller/subsystem controller bus 412 of the service request and of the code of the first idle channel 410 or 411 from channels 1 through 50 at bus port 412a. Central controller 101 then seeks to locate an idle dial detection circuit 404. If one is available, central controller 101 arranges the connection of the idle channel to the idle dial detection circuit. The connection, for example, of channel 1, leads 410, to dial detection circuit 1, leads 441, is temporarily preserved in temporary memory 301a. Simultaneously, central controller 101 signals subsystem 401 over bus 412 to change the channel status of the allocated channel from reserved to busy. The selected dial detection circuit 404 then causes dial tone to be provided over the assigned channel to the calling line requesting service, signifying to the user that dialing may begin. At the completion of dialing, central controller 101 recognizes the nature of the service request and searches for either an idle central office trunk or arranges an intrasystem call over an intrasystem trunk.

The more complicated call is the intrasystem call so that call will be discussed in detail. From temporary memory 301a, central controller 101 obtains the last location of the dialed line. Assuming for a moment the last location of the dialed line is within subsystem 401 where the call originated, a request for assignment of another idle channel is transmitted to subsystem 401 over bus 412. If another subsystem controller such as subsystem controller 402 is associated with the called line, then a request is made over bus 422 for an idle channel.

Following the progress of an intrasystem call to subsystem controller 402, assignment data of the first idle channel 420 or 421 is returned over bus 422. Consequently, central controller 101 signals subsystem 402 to change the status of the allocated channel to busy. Then, an idle intrasystem trunk circuit 403 is located and a switching path to the trunk reserved in temporary memory 301a. Thereafter, central controller 101 causes the release of the connection to the selected dial detection circuit 404 and connects the calling party to the called party through the intrasystem trunk 403. In accordance with techniques known in the art, the call is supervised for an on-hook indication by central controller 101.

Upon the occurrence of an on-hook condition, subsystem controller 401 and 402 are alerted over buses 412 and 422, respectively to return assigned channel status to idle. Simultaneously, the network connection temporarily stored in temporary memory 301a is erased.

The intrasystem trunk circuit 403 comprises a channel bridging capability. This bridging capability is frequently employed because a key telephone station is likely to share the same line as another station. For example, one calling or called line of an intrasystem call may appear upon key telephone sets located in the same or different subsystems. The central controller 101 recognizes a change of switchhook status of a station to be added to an ongoing call and, as a result, bridges the new station into the ongoing call at the intrasystem trunk circuit 403. Service circuits 406 normally provided by central controller 101 are for providing standard tones such as busy tones and special features such as conferencing in accordance with generally known techniques.

It can be seen from the above discussion that central controller 101 is practically identical in its operation with controllers employed in a wholly wired environment. Accordingly, there is no difficulty in providing, if desired, wired telephone station apparatus 407. Many of the advantages of the present system are defeated with the addition of telephone wiring; however, it is important to note that wiring of a premises is not precluded.

SUBSYSTEM CONTROLLER

Figure 5:
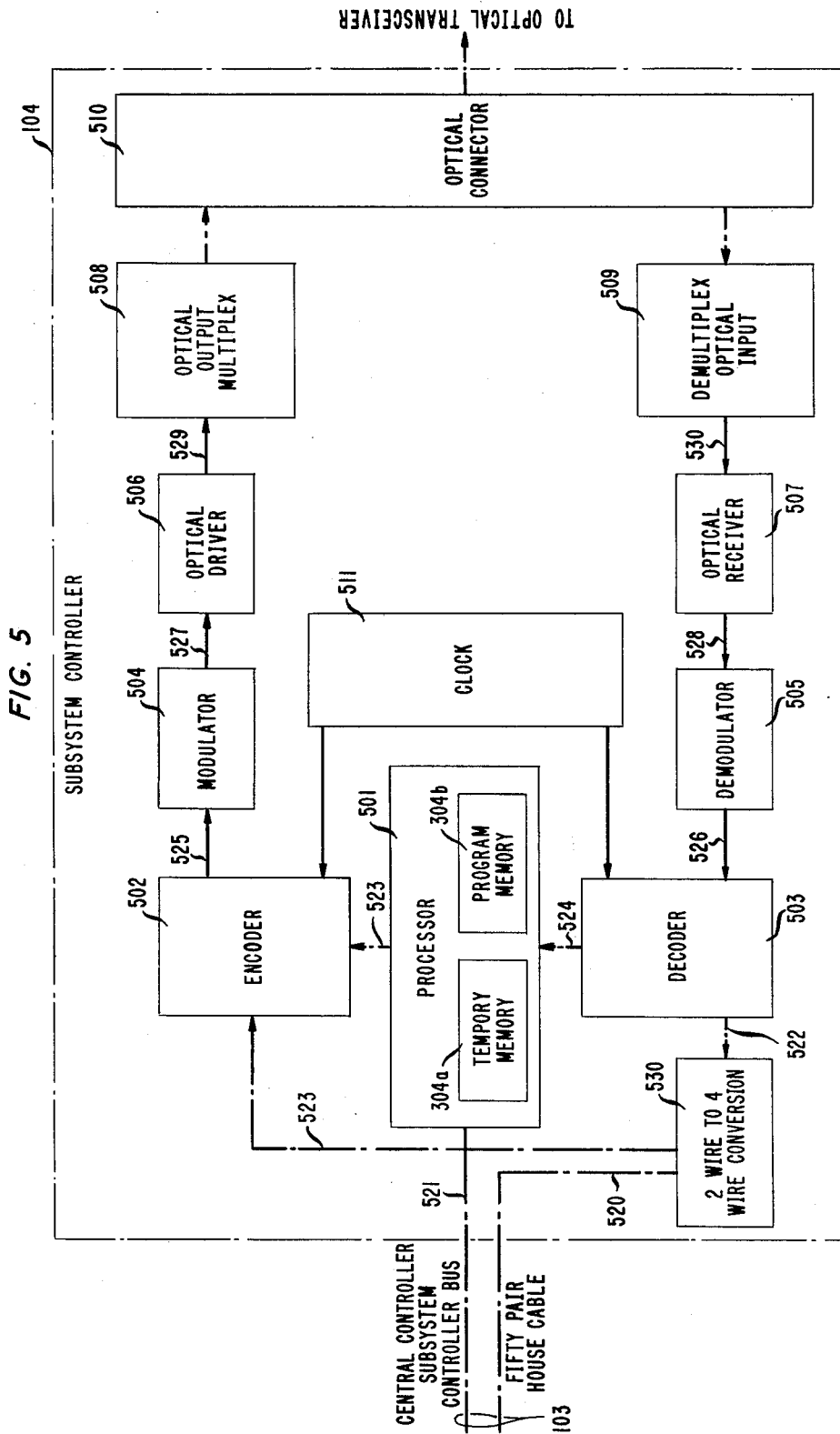
FIG. 5 is a block diagram of one embodiment of a subsystem controller which may be employed in the present cordless key telephone system.

Referring now to FIG. 5, there is shown a block diagram of one embodiment of a subsystem controller which may be employed in the present cordless key telephone system. The subsystem controller is connected to the central controller 101 by a house cable comprising fifty channel pairs 520 of telephone tip and ring leads and a central controller/subsystem controller bus 521. Processor 501 of the subsystem controller receives and transmits data to the central controller 101 over bus 521. In order to maintain a synchronous relationship among subsystem controllers, bus 521 to processor 501 and to all other subsystem processors comprises clock signal leads in addition to data leads. Data is transmitted and received in parallel data format in the depicted embodiment.

Processor 501 is preferably a microprocessor such as an Intel Corp. sixteen bit 8086. Processor 501 has a read/write memory which is allocatable into permanent storage 304b for algorithms and temporary storage 304a for call processing and other data. Processor 501 controls the data encoding and decoding functions of encoder 502 and decoder 503, respectively. In answering service requests from calling stations, processor 501 operates responsive to data received from the calling stations on input port 524. Responsive to data received from the central controller, processor 501 provides updated lamp status, polling, and other data over output port 523 to encoder 502. Other leads of ports 523 and 524 are for controlling the encoding and decoding of data.

A fifteen megahertz clock 511 is provided for synchronizing the encoding and decoding of data. Data transmitted from the station to subsystem controller is decoded from the ten to fourteen megahertz band. Data transmitted in the subsystem controller to station direction is encoded into the sixteen to twenty megahertz band.

Fifty two-wire-to-four-wire conversion circuits 530 are required between the outputs of the encoder and decoder and the fifty pair house cable 520. The separate directions of optical transmission are rejoined at the conversion circuitry 530.

Modulator 504 is connected to the serial data output stream 525 of encoder 502. It in turn provides modulating signal 527 for driving optical driver 506. Optical driver 506 provides a modulated infrared signal on single optical fiber 529 at the input to optical multiplex port 508. At optical port 508, a plurality of amplified identical outputs are provided responsive to input signal 529. At optical connector 510, the resultant fibers are joined into transmit and receive fiber optic pairs. Each fiber optic pair then connects the optical connector 510 to a transceiver.

In the station to subsystem controller direction, the receive fiber of an optical fiber cable pair is connected at optical connector 510 to optical demultiplex port 509. There the resulting optical signals are summed and amplified. The output signal 530 operates a photoresponsive diode or other device of receiver 507. Its baseband output signal 528 is demodulated at demodulator 505. Data stream 526 is provided at decoder 503. Decoder 503 provides service request and other data to processor 501 over leads 524 and telephone data to the conversion circuits 530 over leads 522.

It may be seen from the above discussion that the subsystem controller performs no line to channel concentration function. Its purpose is to translate data into appropriate format for transmission in either of two directions: toward the station or toward the central controller. In the direction toward the station, the subsystem controller operates responsive to a central controller request. It constructs a serial data stream from fifty channels of telephone information and from data received over bus 521 and from data in its temporary memory 304a. Frames of communicative data are constructed in accordance with the subsequent discussion of FIG. 8.

Such functions in a small cordless system environment, for example, less than five hundred lines, can be provided at the location of the central controller. Thus, in a small cordless key telephone system, no separate subsystem controllers are required. The functions may be integrated into the design of central controller 101 and accomplished by it.

In the direction toward the central controller, the subsystem controller operates responsive to frames of data transmitted by the cordless stations. The data transmitted by the station is in the format subsequently discussed in FIG. 9. The subsystem controller, having polled a station, learns that it is "present," and of a change from on-hook to off-hook status if its status has changed and locates an idle channel. The subsystem controller then alerts the central controller over bus 521 of the status change and the reserved assignment of the previously idle channel. To do so, it must consult its temporary memory 304a, first, to recognize the change of status from on-hook to off-hook, then, to reserve the first idle channel of the fifty potentially available channels.

CORDLESS STATION APPARATUS

Figure 6:
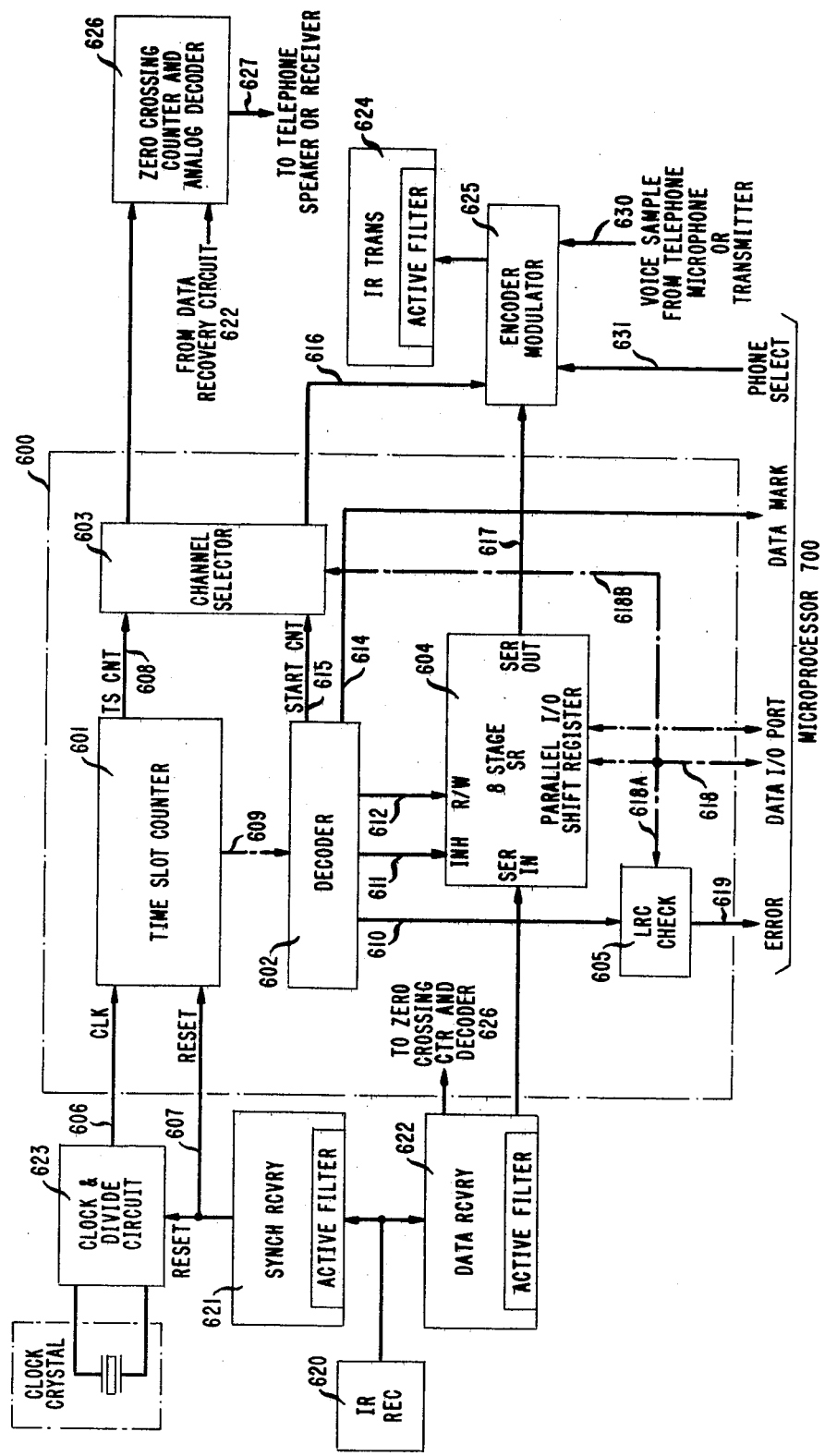
FIGS. 6 and 7 are block diagrams of a cordless key telephone station set employed with the present invention.
Figure 7:
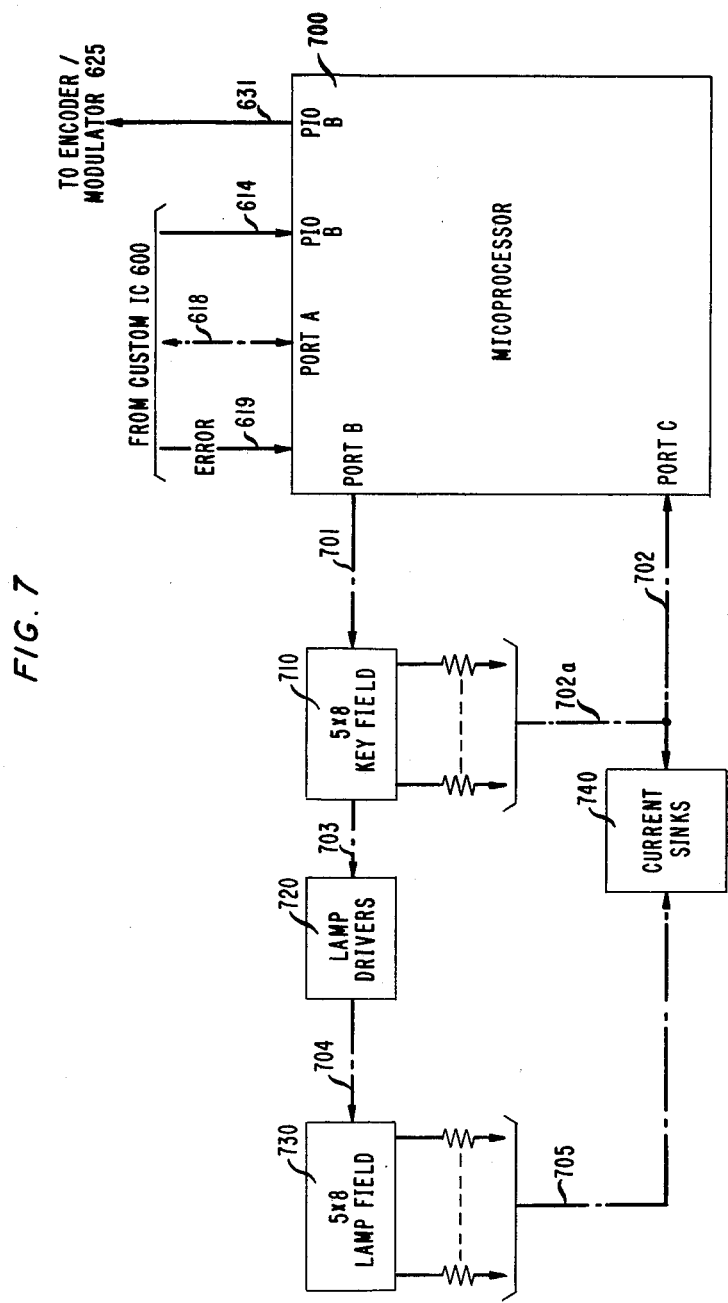

Cordless station apparatus for application with the present key telephone system is disclosed in pertinent part in FIGS. 6 and 7. Telephone transmitter and receiver apparatus is not shown because the design of such apparatus is well known. One important caveat is that power conserving apparatus should be used wherever possible. For example, electret transmitters and receivers, light emitting diode or liquid crystal displays, and energy conserving touch sensitive keyboards should be employed. Also, custom integrated circuit technology is applied wherever possible in the present circuit.

One custom integrated circuit 600 shown in FIG. 6 comprises many logic and circuit elements including lateral redundancy check circuit 605, decoder 602, time slot counter 601, channel selector 603, and serial to parallel shift register and logic circuit 604. External to the custom integrated circuit 600 of FIG. 6 are shown clock and divide logic circuit 623, infrared receiver 620, synchronization recovery circuit 621, data recovery circuit 622, zero crossing counter and analog decoder 626, encoder and modulator circuit 625 and infrared transmitter 624. Many of these latter elements comprise active filter components which may be designed in accordance with switched capacitor filter CMOS integrated circuit technology.

Processor 700, shown in FIG. 7, is most conveniently a three port, eight bit microprocessor. One such microprocessor which may be employed is an Intel Corp. 80C48. The CMOS circuitry of the 80C48 promotes energy efficiency. Port A comprises eight leads for data input and output. Port B comprises five scanning leads for scanning a five by eight key field 710 and for operating lamp drivers 720 for operating a five by eight lamp field 730. The three remaining leads of port B provide a lateral redundancy check lead 619, a phone select control lead 631 to encoder/modulator circuit 625, and a data mark lead 614 from decoder circuit 602 for strobing the microprocessor 700 to read data on bus 618.

Processor 700 generally operates responsive to a polling request for data received at infrared receiver 620 (FIG. 6). Data recovery circuit 622 extracts the polling and other data such as lamp lighting data from the demodulated and decoded output of infrared receiver 620. A serial data stream is provided to shift register 604 and to zero crossing counter and analog decoder 626. Read/write lead 612 from decoder 602 indicates to shift register 604 when to output or input data on bus 618. Data bus 618 is thus employed to provide data in parallel format to port A of processor 700 shown in FIG. 7. At the same time as data is shifted into microprocessor 700, the data is also shifted on leads 618A into the lateral redundancy check circuit 605 which, responsive to decoder 602, signals the processor 700 on lead 619 if there is an error so that microprocessor 700 may ignore the data of port A and await an error-free transmission.

Bus 618 is employed for two other purposes. Bus 618 is employed for the purpose of outputting button data to shift register 604. The button data is converted to serial format by register 604 and a serial data stream is provided to encoder and modulator circuit 625 for transmission.

Processor 700 also employs bus 618 during a floating mode to load channel allocation or assignment data on leads 618B into channel selector circuit 603. In this manner, the cordless station is enabled to decode the appropriate telephone message channel data at zero crossing counter and analog decoder 626 as well as to time slot multiplex a voice sample into an appropriate time slot channel at encoder modulator 625.

Frame synchronization for incoming data from infrared demodulation and decoder circuit 620 is provided by frame synchronization recovery circuit 621. In particular, a frame mark is provided by means of a phase reversal appearing in the first two time slots of a frame. Recognition of the bit reversal by means of an active tank filter at fifteen megahertz causes the resetting of clock and divide logic circuit 623 over reset lead 607. Clock and divide circuit 623 provides a time slot counting function output of 1.5 microseconds to time slot counter 601 over clock lead 606. When a new frame of eighty three time slots is recognized at circuit 621, it is clear that time slot counter 601 has reached a count of 83 time slots for the previously transmitted frame. Lead 607 is, thus, also used to reset time slot counter 601. Count control leads 609 indicate to decoder circuit 602 when the time slots allocated to data have been entered into shift register 604. Responsive to this event, decoder 602 alerts shift register 604 on inhibit lead 611 to inhibit the serial shifting of data. Time slot counter 601 also indicates to channel selector 603 a time slot count on lead 608 representative of the fifty time slots reserved for telephone voice sample data. The fifty channel count begins responsive to a command on start count lead 615 from decoder 602.

Microprocessor 700 (FIG. 7) in accordance with techniques known in the art scans for off-hook and on-hook status as well as for keypad signaling and line button status. Its highest priority is to immediately respond to an incoming polling request; however, it also performs matrix scanning and visual indicator or lamp lighting functions. Five leads 701 from port B of microprocessor 700 poll key or button field 710 one row at a time. The eight leads of port C provide input to microprocessor 700 as to which columns of key field 710 have been actuated. Key field 710 may comprise a signaling keypad, a key field for line pickup, as well as the switchhook contact of the present cordless set.

For activating light emitting diodes or lamps, more than one lead of port B may be actuated at a time. Port C is then employed for outputting a column indication to current sink 740. The simultaneous actuation of a lamp driver 720 and a current sink 740 causes the lighting of a lamp in lamp field 730. In similar fashion, a subsequent concurrent actuation of a lamp driver and current sink causes their associated lamp to extinguish. A flashing algorithm can be implemented by use of a clock of microprocessor 700. The scanning algorithm of microprocessor 700 is temporarily interrupted for performing lamp lighting algorithms.

Microprocessor 700 also actuates encoder and modulator 625 (FIG. 6) over phone select lead 631 for insuring that a voice sample is transmitted in an appropriate time slot at transmitter 624. The audio signal output 630 is sampled at an eight kilohertz rate as clocked by phone select lead 631. The resulting sample is sent as a frequency burst within the allocated time slot channel provided by channel select leads 616. The frequency burst in accordance with known techniques is a linear function of the sampled voice signal voltage.

In the receive direction, data recovery circuit 622 provides the data output to zero crossing counter and analog decoder 626. Channel selector circuit 603 provides the counter 626 with the allocated channel number of the received telephone data. The voice output 627 of the zero crossing counter and decoder 626 is provided to a telephone speaker or receiver of a handset. Zero crossing counter 626 automatically accounts for reflected transmissions and transmissions received from more than one transceiver. Decoder 503 of FIG. 5 likewise employs a zero crossing counting technique to provide a relatively noise-free output.

An exemplary frame of data for transmission in the subsystem controller to cordless station direction is shown in FIG. 8. Other time slot allocations may be employed which may be more or less efficient and which recognize more or fewer transmission channels, subsystems, and cordless telephone stations. It is believed that one ordinarily skilled in the art may vary the suggested format in accordance with their particular design requirements.

Choice of an eight kilohertz sampling rate for the voice sample at lead 630 results in a 125 microsecond duration for each frame. As has been previously discussed, the time slot counting function has been selected at 750 nanoseconds and the time slot size is approximately 1.5 microseconds or double the counting function to account for accurate zero crossing counting, transmission delays, and noise. Eighty three time slots are thus provided in total of which fifty are reserved for telephone voice data.

The first two time slots of data are reserved for a frame mark which, in the present key telephone system is accomplished by the previously discussed phase reversal recognized by frame synchronization recovery circuit 621. The next four time slots indicate to the station set the subsystem where the cordless set is currently located. The next thirteen time slots are reserved for the unique address of a polled cordless station. These time slots provide sufficient capacity for polling over eight thousand telephones, a very large key telephone system.

The next ten time slots comprise two elements, a field designator of four time slots and a data field of six time slots. The field designator may be used to indicate to processor 700 what kind of data the field comprises. For example, an entry of value zero in the field designator may indicate that the date field comprises the channel assignment, six time slots being sufficient to identify a channel number between one and fifty.

The last four time slots are for checking for errors in the data time slots. Any kind of parity or other error checking techniques known in the art may be employed. An LRC check is suggested.

Referring briefly to FIG. 6, these four time slots are associated with the report on leads 618A to LRC check circuit 605 where an error report is generated on lead 619.

An exemplary frame of data for transmission in the cordless station to subsystem controller direction is shown in FIG. 9. As the data which must flow in this direction is less demanding of time slots, only twenty four time slots of thirty three possible slots are employed.

The first two time slots are employed for a framemark. The next eight may represent a distinctive "present" signal which indicates to a subsystem controller that the station scanned on previous received frame is still located within a subsystem and has not moved to a new subsystem. The distinctive code may be, for example, 10101010.

The next eight time slots are for button status. A maximum size key field for the cordless station set is thus presumed to comprise sixty-four switchable elements. In the discussion of FIGS. 6 and 7 depicting one cordless station set of the present invention, a practical, maximum key field size of forty elements was suggested.

The switchhook status for the actuated line of the key field appears in the next time slot. If the battery is low in the cordless set, the subsystem controller may be informed in the next time slot. The last four data time slots are reserved for error checking.

AUTOMATIC LOCATION OF MISSING CORDLESS STATIONS

Referring now to all the previously introduced figures, the operation of the present system in automatically locating missing cordless stations will be explained in detail. A cordless station is determined missing whenever it fails to respond or is precluded from responding when it is polled by central controller 101.

Missing stations thus include "in-service" stations which have moved from one subsystem to another during the transistory period between the last time they were polled and the present. The missing in-service station may be involved in an on-going call or currently idle when it is moved.

Missing stations also may include those which are "out-of-service." In order to take a cordless station out of service, its power may be removed. It may be placed in a closet or drawer where any transmission from it is thwarted. The out-of-service cordless phone is missing because it cannot respond with a present signal when polled.

A cordless phone in the system is polled, during an on-going call, approximately every 100 milliseconds. It is also useful to poll in-service stations at this same rate during their idle periods in order to detect changes in cordless station switchhook status and, similarly, to report indicator lamp or light emitting diode status changes to the cordless station.

Polling an out-of-service station at a 100 millisecond interval is not necessary. The station which is out-of-service will be detected quickly and may be placed on a low priority out-of-service polling list in memory 301a of controller 101.

A cordless station is first polled by its unique station code in the last subsystem stored in temporary memory 301a. In large systems where there are more than two subsystems, adjacent subsystems are polled first. It is presumed that the missing station will likely be found there and searching only adjacent subsystems frees all other subsystems to respond quickly to stations which are in service. If the missing station does not respond from within an adjacent subsystem, all other subsystems are then requested to poll for the missing station. Accordingly, an out-of-service phone will not report a "present" signal in three successive attempts to locate it. A first attempt is made to locate the missing phone in its assigned subsystem. If the attempt is unsuccessful, an attempt is made to locate it in adjacent subsystems, and lastly in all other subsystems.

The out-of-service phone will be identified as out-of-service after a maximum of three hundred to four hundred milliseconds. The out-of-service phone's unique code is placed along with a clock time indication on an out-of-service list in temporary memory 301a. The out-of-service phone is polled less frequently than the in-service phone to conserve processing time for in-service telephones. For example, the out-of-service phone may be polled every second or even less frequently.

An out-of-service phone list may be provided by central controller 101 to telephone personnel for maintenance or billing purposes. Because of the automatic reporting of out-of-service phones, a considerable savings in requirements for maintenance and other telephone personnel is anticipated with the present system. Of course, the major advantage in savings comes from the automatic rearrangement of in-service phones.

An in-service missing phone is detected in a new subsystem within the time frame that an out-of-service phone is identified as out-of-service, namely, after one hundred to three hundred milliseconds maximum. The one hundred to three hundred millisecond identification interval applies whether the in-service phone is idle or involved in an on-going call.

If the phone is involved in an on-going call, an idle channel must be immediately requested in the subsystem the missing, now found, phone has moved to. The new channel is then bridged to the connected central office trunk or intrasystem trunk held in network memory 301a and the old channel released. Altogether the movement of a station involved in an on-going call to a new subsystem may create a switching delay of as long as one more cycle time or a total maximum delay of three hundred to four hundred milliseconds.

In an office rearrangement, where phones are permanently moved from one subsystem to another, phone data is automatically updated in memory 301a. The cordless phones are moved in such a rearrangement without the intervention of maintenance or other personnel resulting in a considerable savings of expenses normally associated with telephone rearrangements.

What is claimed is:

1. A cordless telephone system characterized by
   a central controller (101) for switching telephone communications, means at the central controller for transmitting and receiving a plurality of coded message signals, the coded message signals transmitted and received over transmission channel means (410, 411), the transmission channel means connecting the central controller to a particular number of transceivers adaptably dispersed so as to divide a location of the telephone system into a number of cells, each cell having at least one transceiver, the system further including at least one cordless telephone station having a particular unique address, the cordless telephone station communicating with the transceiver over an optical transmission end link, the cordless telephone station being relocatable from a first cell to a second cell within the telephone system, the central controller providing telephone service to the cordless telephone station during movement of the station from the first cell to the second cell essentially without interruption over a particular assigned channel of the transmission channel means.

2. A cordless telephone system as recited in claim 1 further characterized by
   a plurality of subsystem controllers (104), each subsystem controller controlling telephone communications and having memory (304a) for storing the addresses of cordless telephone stations (107, 108, or 110) located within cells (201-207) associated with the subsystem controller, each subsystem controller being connected to the central controller (101) by transmission and control channel means (103), each subsystem controller particularly polling the cordless telephone stations located within its associated cells, each cordless telephone station responding to the polling by transmitting a present signal, the subsystem controller reporting the address of a nonresponding cordless telephone station over control channel means (521) to the central controller, the central controller responding to the report by requesting over control channel means all other subsystem controllers to request a response from the nonresponding cordless telephone station.

3. A cordless telephone system as recited in claim 1 or 2 further characterized in that
   the cordless telephone station comprises a key telephone station set (107).

4. In a cordless telephone station system comprising a central controller, a number of subsystem controllers connected to the central controller by transmission channel means (410, 411, 520) and control channel means (412, 521) and a plurality of transceivers (105, 106, 109) located at cell locations and connected to the subsystem controllers by transmission channel means (113), a method of identifying movement of a cordless telephone station from the control of one subsystem controller to the control of another subsystem controller comprising the steps of: assigning a particular unique address to each cordless telephone station; the subsystem controller periodically polling each cordless telephone station within a subsystem according to its particular unique address; in the event a cordless telephone station fails to respond with a present signal, the subsystem controller transmitting over control channel means to the central controller for temporary storage in memory the particular unique address of the nonresponding station; the central controller causing other subsystem controllers to grab an available frame of information to be transmitted toward its associated optical transceivers, the other subsystem controllers polling their associated cordless telephone stations according to the particular unique address of the nonresponding cordless telephone station; a subsystem controller, upon locating a missing station, reporting to the central controller the particular unique address of the located station.

5. A method of identifying a movement of a station from one subsystem to another as recited in claim 4 additionally comprising the steps of assigning in temporary memory a high priority to a particular nonresponding station when first reported missing; with each successive polling by other subsystem controllers for the particular nonresponding station, reducing the priority level for the nonresponding station such that, as the priority level decreases, the frequency of search for the nonresponding station also decreases.

6. A method of identifying movement of a station from one subsystem to another as recited in claim 4 additionally comprising the step of polling the stations of subsystem controllers adjacent to the reporting subsystem controller before polling subsystem controllers situated at a greater distance from the reporting subsystem controller.

7. Cordless station apparatus for receiving an optical signal modulated by a data and telephone signal, the apparatus comprising means (623) for dividing a clock signal by a particular number to derive a time slot counting function; counting means (601) responsive to the dividing means; decoding means (602) responsive to the counting means, the decoding means providing a telephone channel counting signal to a channel selection means (603) and data transfer means (618) for providing data to a microprocessor (700), the microprocessor updating an associated memory responsive to the transfer of data.

8. Cordless station apparatus as recited in claim 7, the data transfer means (618) having first and second modes of operation, the first mode for transferring cordless station update data to microprocessor the (700), the second mode for providing new channel data to the channel selection means (603).

9. An electronic key telephone station set characterized by
a microprocessor (700) comprising first and second output leads or ports (701, 702), the first and second output leads or ports for scanning a key or button field (710) in a first mode of operation and for lighting lamps of a lamp field (730) in a second mode of operation.

10. A cordless telephone system comprising:
a central controller for switching telephone communications, a plurality of subsystem controllers connected to the central controller, each subsystem controller being connected to a particular number of transceivers, the transceivers being dispersed so as to divide a location of the telephone system into a number of cells, each subsystem controller being associated with at least one cell and each cell having at least one transceiver, a plurality of cordless telephone stations each having a unique address, the cordless telephone stations being relocatable from a first cell to a second cell within the telephone system, each subsystem controller polling the cordless telephone stations located within its associated cell, the subsystem controller reporting the address of a nonresponding cordless telephone station to the central controller, the central controller responding to the report by requesting all of the subsystem controllers to request a response from the nonresponding cordless telephone station.

11. A cordless telephone system as in claim 10 wherein the cordless telephone stations are connected to an associated transceiver by an optical link.

12. A cordless telephone system as in claim 10 wherein the central controller provides telephone service to the cordless telephone stations during movement of a station from the first cell to the second cell without interruption.

13. A cordless telephone system as in claim 10 wherein each subsystem controller is connected to the central controller by transmission and control channel means, the subsystem controller reporting the address of a nonresponding telephone station over the control channel means and the central controller responding to the report by requesting over the control channel means all other subsystem controllers to request a response from the nonresponding telephone station.

14. A cordless telephone system as in claim 10 wherein each subsystem controller comprises a processor having memory and encoding and decoding circuitry, the subsystem controller reformatting data received from a cordless telephone station for transmission to the central controller and reformatting data received from the central controller for transmission to the cordless telephone station.

15. A cordless communication system comprising:
a central controller for switching communications, a plurality of subsystem controllers connected to the central controller, each subsystem controller having a plurality of terminals associated therewith, each terminal having a unique address, each subsystem controller periodically polling the terminals associated therewith, the subsystem controller reporting the address of a nonresponding terminal to the central controller, the central controller responding to the report by requesting all of the subsystem controllers to request a response from the nonresponding terminal.

16. In a cordless communication system comprising a plurality of subsystem controllers, a method of permitting movement of a terminal from the control of one subsystem controller to the control of another subsystem controller comprising the steps of:
assigning a particular unique address to each terminal; causing each subsystem controller to periodically poll each terminal that responded to the previous poll according to its unique address; in the event a terminal fails to respond, transmitting to other subsystem controllers the unique address of the nonresponding terminal; causing the other subsystem controllers to poll for the nonresponding terminal according to its unique address; and causing a subsystem controller, upon receiving a response from the terminal to assume control over the terminal.

* * * * *